April 14, 1959 A. A. SPENCE 2,881,926
SUN VISOR HOLDER ATTACHMENT
Filed June 21, 1955

INVENTOR.
ALBERT A. SPENCE
BY
John A. Robertson
ATTORNEY.

United States Patent Office 2,881,926
Patented Apr. 14, 1959

2,881,926

SUN VISOR HOLDER ATTACHMENT

Albert A. Spence, McKee City, N.J.

Application June 21, 1955, Serial No. 516,828

2 Claims. (Cl. 211—89)

The present invention relates to a sun visor attachment and is concerned primarily with the provision of a holder attachment of a simplified construction capable of performing a multiplicity of functions.

The driver of an automobile often has need of certain accessories which should be available to him with a maximum of convenience. Thus, while going on an extended trip, he often has need of a road map. Then again, if he be a salesman or one engaged in making a canvass or survey, there will be occasions when he wants to make notes in a notebook. Thus, both the notebook and pencil should be conveniently available. A woman driver often requires a mirror to tidy her appearance before leaving a car, and finally it is noted that a flashlight is often required for various purposes.

Prior to the advent of this invention, it has been the general practice to keep the accessories, above noted, in the glove compartment. However, when so stored, they are not conveniently available and considerable difficulty is experienced in obtaining access to them. While certain attempts have been made to provide an attachment that may be applied to the sun visor of an automobile, such devices have generally proven to be unsatisfactory for various reasons.

With the foregoing conditions in mind, the present invention has in view as its foremost objective the provision of a holder attachment that is intended to be detachably secured to the sun visor of a motor vehicle, and which attachment consists, essentially, of a pair of U-shaped leaf springs that are secured in spaced relation by a so-called "drawbar." These leaf springs are intended to be fitted over the sun visor of an automobile with a spring fit affording a good holding effect with the bars of the spring being provided with a holding device for receiving certain of the accessories, above noted.

More in detail, the invention has as an object the provision, in a sun visor holder attachment of the character noted, of a pair of U-shaped leaf springs, each having an arm to which is integrally joined by a bend a tongue that amounts to a continuation of the spring. Thus, each tongue cooperates with the arm of the spring to provide a recess with the two recesses cooperating to receive one or more road maps or similar data.

Still another object of the invention is to provide, in a sun visor holder attachment of the type noted, a pair of U-shaped springs having tongue extensions of the type aforesaid with each tongue having secured to its exposed face a spring clip with the two clips cooperating to receive a notebook or similar article.

Another object is to provide, in a sun visor holder attachment of the character indicated, pencil-holding means in the form of small spring clips which preferably are secured to the exposed faces of the tongue extensions. These pencil-holding clips preferably are located just below the clips which receive the notebook.

As above mentioned, each of the spring clips which engage the sun visor has two arms. One of these is located on the lower side and carries the tongue extension and spring clips, above mentioned. A further object of the invention is to provide each arm of the spring clip on the other side with means for detachably receiving a flashlight. This means also preferably takes the form of spring clips which are shaped to conform to the contour of the flashlight.

It is important that the road map or comparable material be readily and easily inserted in the recess provided for its reception. Thus, another object is to provide, in a sun visor holder attachment of the type noted, a drawbar which connects the two free ends of the two tongue extensions. This drawbar serves, not only to join the two U-shaped springs in spaced relation, but also as a guide which aids in placing the road map or other material where intended.

Following this same thought, a further objective in view is to provide, in a device of the character noted, a pair of spring clips on the exposed faces of the tongue extensions and which clips have free ends connected by another drawbar. This drawbar aids in maintaining the assembled relation and also functions as a guide.

A device made in accordance with the above-noted objectives is susceptible of being manufactured so cheaply that it may be given away by large companies for advertising purposes. In such cases, it is important that advertising data be appropriately displayed. Thus, another object of the invention is to provide, in a sun visor attachment of the type noted, a pair of U-shaped spring clips having arms on one side between which extends a plate on which is displayed appropriate advertising data. This plate is located in an exposed position such as between the tongue extensions or spring clips carried thereby.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a sun visor holder attachment consisting, essentially, of a pair of U-shaped leaf springs, each having a pair of arms. The latter arms on one side are provided with tongue extensions that are spaced from the arms to provide recesses for receiving one or more road maps or similar materials. The free ends of the tongue extensions are joined by a drawbar. These tongue extensions on their exposed faces carry a pair of large spring clips for receiving a notebook and a pair of small clips for a pencil. The spring arms on the other side carry spring clips shaped to conform to the contour of a flashlight detachably received thereby. An advertising plate may be included and is located between either the tongue extensions or spring slips carried thereby.

For a full and more complete understanding of the invention, reference may be had to the following description and accompanying drawing wherein.

Figure 1:
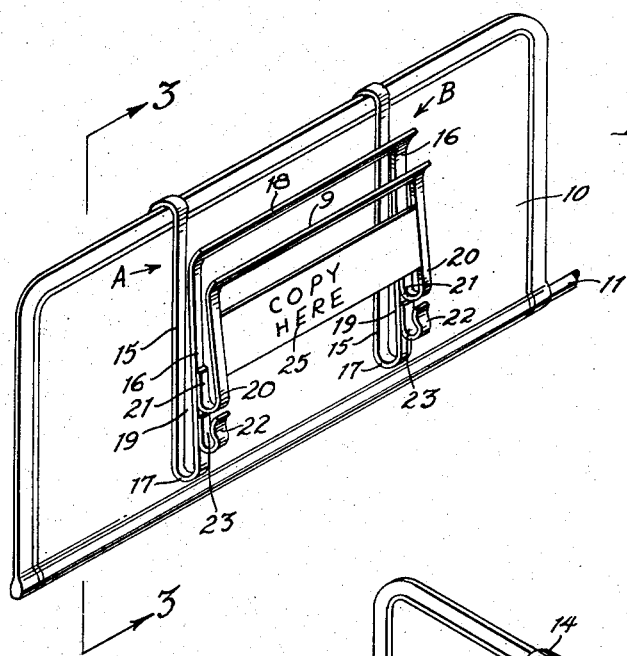
Figure 1 is a perspective of a sun visor of a motor vehicle having a holder attachment designed in accordance with the precepts of this invention applied thereto.
Figure 2:
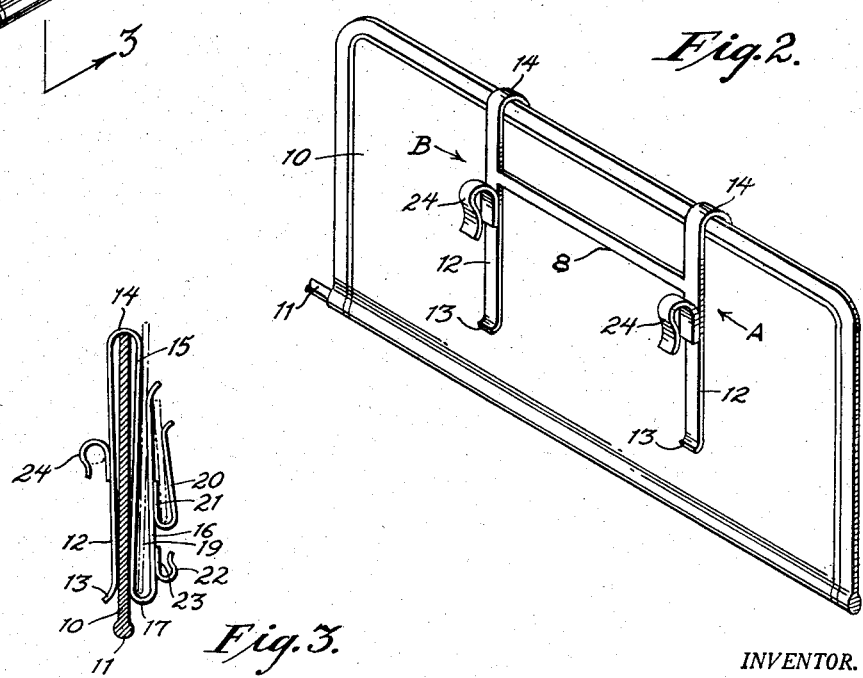
Figure 2 is another perspective view showing the other side of the visor and attachment.
Figure 3:
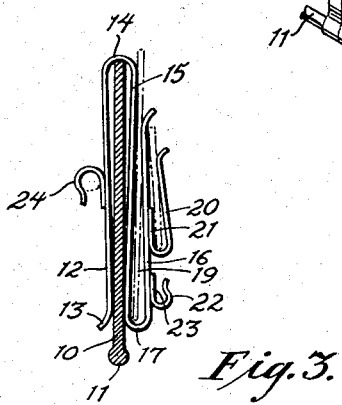
Figure 3 is a vertical cross section taken about on the plane represented by the line 3—3 of Figure 1.

Referring now to the drawing wherein like reference characters denote corresponding parts, the conventional sun visor 10 is shown as being carried by an arm 11 in a well-known manner. The holder attachment of this invention comprises two leaf springs which are referred to in their entirety by the reference characters A and B. Inasmuch as each of these springs and the structure carried thereby are substantial duplicates, only one spring is described in detail as that is believed to be sufficient for the purposes of this specification.

Each spring comprises a top arm 12 having a curled-out edge 13 which facilitates slipping of the spring over the visor. Integrally joined to this top arm 12 by a bend 14 is a front arm 15. A tongue extension 16 is integrally joined to the end of the arm 15 by a bend 17 and the ends of the tongue extensions are integrally joined by a drawbar 18. The tongue extension 16 is spaced from the arm 15 to provide a recess 19 with the recesses on the two springs cooperating to accommodate a road map or similar material.

A spring clip 20 includes a tab 21 and is secured to the exposed face of the tongue extension 16 in any preferred manner, as by welding. These spring clips 20 have ends joined by a drawbar 9 for facilitating the insertion of a notebook or similar material therebeneath.

A small spring clip 22 has an anchoring tab 23 that is also secured to the exposed face of the tongue extension 16 beneath the spring clip 20. The two spring clips 22 are intended to accommodate a pencil.

The exposed face of each arm 12 carries a spring clip 24 that is shaped to conform to the contour of a flashlight or other article desired to be secured thereby.

The two springs A and B are secured together in spaced relation by the drawbars 9 and 18 and crossbar 8. These drawbars may be supplemented by a plate 25 that is located in an exposed position so that any advertising data displayed thereon is readily and easily viewed. Thus, the plate 25 is located either between the tongue extensions 16 or the clips 20.

Operation

While the manner of using the holder attachment, above described, is believed to be obvious from the illustration of the drawing and description of parts given, it may be briefly outlined as follows:

The two springs A and B are slipped over the edge of the visor 10 with the latter being received between the arms 12 and 15. The gripping engagement of the springs with the visor holds the attachment in position. Road maps or similar papers are intended to be received in the recesses 19 and held in this position by the gripping engagement of the tongue extensions 16. A notebook or similar article is held on the exposed faces of the tongue extensions 16 by the spring clips 20. A pencil is held by the spring clips 22.

Under ordinary conditions, the road map, notebook, and pencil will be needed more frequently than will the flashlight. Hence, these articles are located on the face of the visor confronting the driver. A flashlight is held by the spring clips 24, and the exact shape of these spring clips will depend on the contour of the particular flashlight to be held.

While a preferred specific embodiment of the invention is hereinbefore set forth, it is to be clearly understood that the invention is not to be limited to the exact constructions, mechanisms, and designs illustrated and described, because various modifications of these details may be provided in putting the invention into practice within the purview of the appended claims.

What is claimed is:

1. In a sun visor holder attachment, a pair of U-shaped springs adapted to be slipped over a sun visor in gripping engagement therewith, each of said springs comprising a pair of arms, a tongue extension integrally joined to one arm of each spring by a bend, with the extension being closely spaced in confronting relation with respect to the arm by which it is carried and cooperating therewith to provide a recess for receiving a road map or similar material, a drawbar joining the ends of said tongue extensions, and a spring clip carried by the exposed face of each tongue extension and cooperating therewith to define a recess for receiving a notebook or similar article.

2. In a sun visor holder attachment, a pair of U-shaped springs adapted to be slipped over a sun visor in gripping engagement therewith, means for securing said springs in spaced relation, each of said springs comprising a pair of arms, a tongue extension integrally joined to one arm of each spring by a bend, with the extension being closely spaced in confronting relation with respect to the arm by which it is carried and cooperating therewith to provide a recess for receiving a road map or similar material, and a pair of small spring clips carried by said tongue extensions and adapted to receive a pencil.

References Cited in the file of this patent

UNITED STATES PATENTS

| 418,420 | North et al. | Dec. 31, 1889 |
| 881,757 | Winsor | Mar. 10, 1908 |
| 1,077,099 | Shafer | Oct. 28, 1913 |
| 1,899,509 | Lapin | Feb. 28, 1933 |
| 2,488,326 | Pratt | Nov. 15, 1949 |
| 2,500,838 | LeVine | Mar. 14, 1950 |
| 2,598,029 | Baldwin | May 27, 1952 |
| 2,637,128 | Weeks | May 5, 1953 |
| 2,642,191 | Hobson | June 16, 1953 |
| 2,672,988 | Johnson | Mar. 23, 1954 |

FOREIGN PATENTS

| 672,195 | Germany | Feb. 22, 1939 |
| 792,342 | France | Dec. 28, 1935 |